Oct. 14, 1969          M. GAL          3,472,529
COUPLING FOR AUTOMOTIVE TOW BARS
Filed Aug. 21, 1967          2 Sheets-Sheet 2
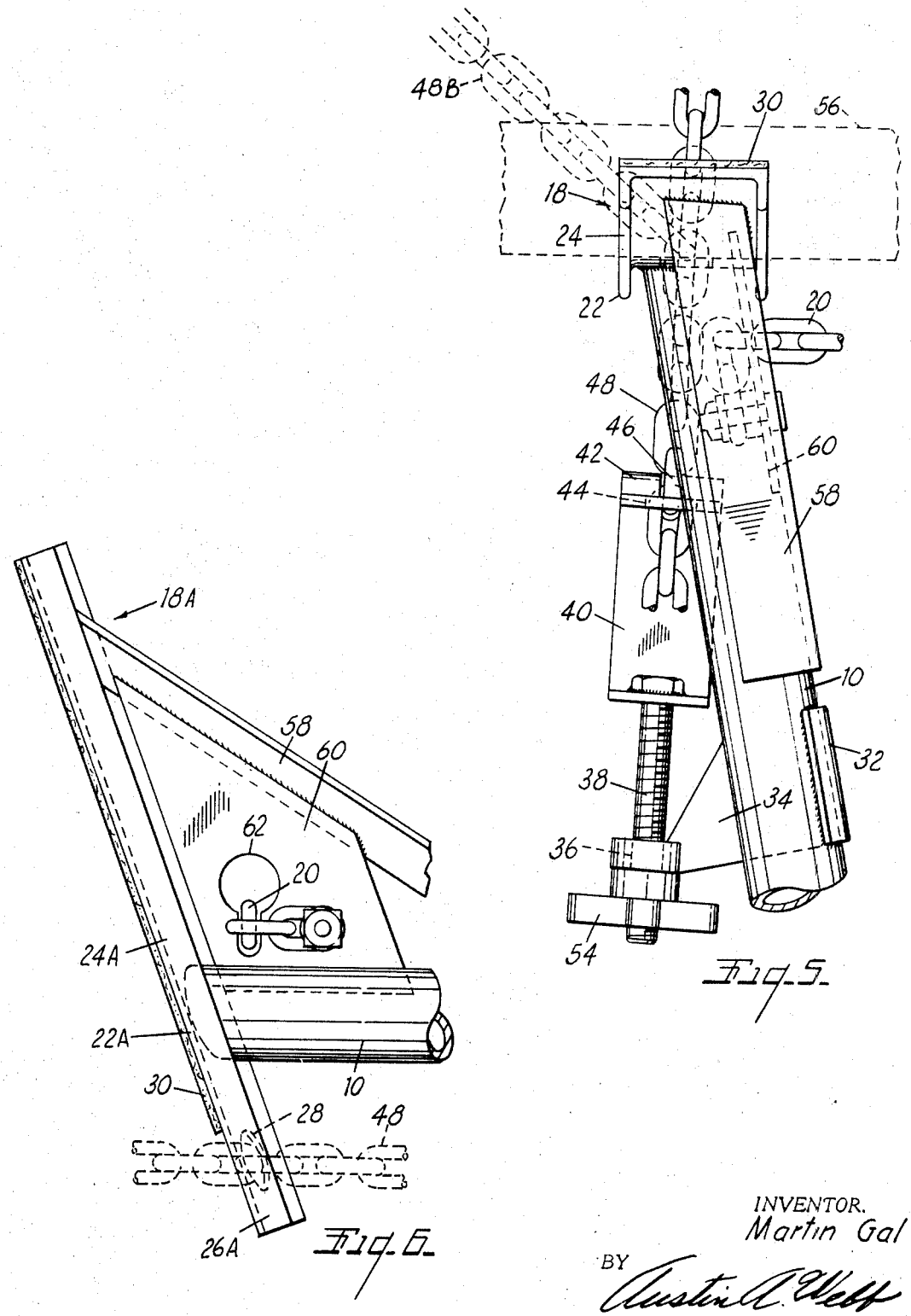
INVENTOR.
Martin Gal
BY Austin A. Webb
ATTORNEY.

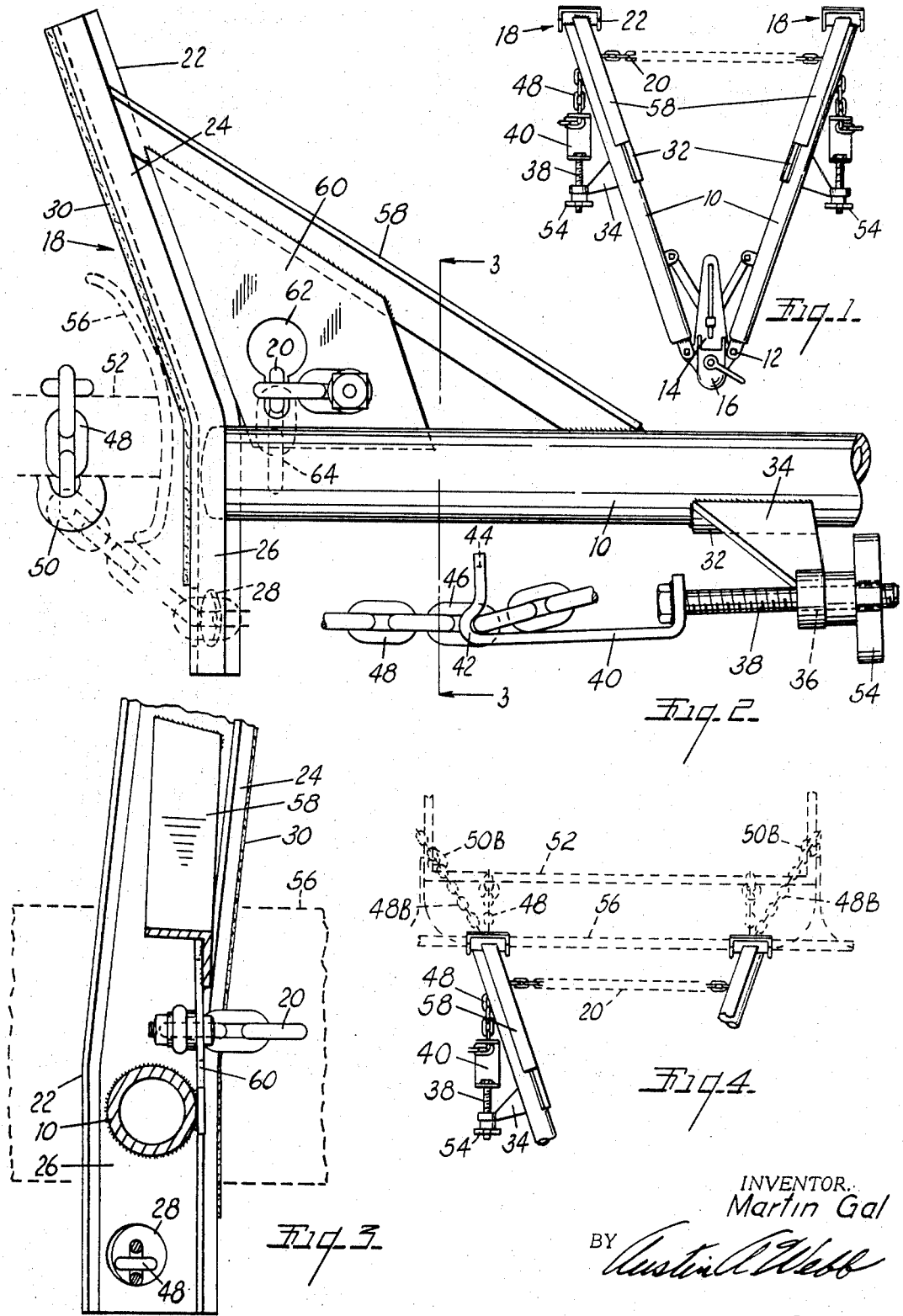

United States Patent Office

3,472,529
Patented Oct. 14, 1969

3,472,529
COUPLING FOR AUTOMOTIVE TOW BARS
Martin Gal, East Lansing, Mich., assignor to Pilot Incorporated, Battle Creek, Mich.
Filed Aug. 21, 1967, Ser. No. 661,849
Int. Cl. B60d 1/14, 1/16
U.S. Cl. 280—502
12 Claims

ABSTRACT OF THE DISCLOSURE

An automotive tow bar having two rigid tow bars pivotally connected at one end to a first coupling for connection to one vehicle and coupling heads at the other end of each tow bar consisting of a generally upright bumper member secured transversely across the end of the tow bar with an upwardly and outwardly inclined bumper engaging face, the two bumper engaging faces being angled inwardly between the two tow bars into the same general plane, the lower ends of the bumper members projecting below the tow bars and defining holes passing towing load chains, the chains having hooks on their outer ends permitting looped connections around frame members behind a bumper, and abutment fixtures on the tow bars supporting screws in general alignment with the openings in the lower ends of the bumper members, the screws having hooks selectively engageable with links of the chains connected thereto, and tightening nuts on the screws engageable with the abutments to tighten the chains and draw the inclined faces of the bumper members against the surface of a bumper. A spread limiting chain has one end connected to the free end of one tow bar and is selectively engageable in a notched member secured to the end of the other tow bar.

---

This invention relates to improvements in coupling for automotive tow bars.

Modified forms of the tow bar provide bumper members that are either straight and inclined throughout their length or which have angled lower ends generally perpendicular to the tow bars.

Outline of invention

The invention lies in a tow coupling having adjustably spreadable, V-connected towing bars; each with a transversely extending upright bumper bar on its free end. The bumper bars extend below their associated towing bar and define chain receiving openings in their lower ends. Chain tightening screws on each bumper bar are arranged to tighten a pair of towing chains passed through the openings to free ends that are selectively engageable with frame elements of a vehicle on which the coupling is mounted. A spread limiting chain is selectively engageable between the towing bars adjacent their free ends to limit spreading of the towing bars. The spread limiting chain resists all lateral spreading forces that may be applied to the towing bars. When the points of connection of the towing chains to the vehicle are spaced further apart than the openings in the bumper bars, the antispread chain prevents shifting of the coupling on the bumper.

An additional feature of the coupling that functions both alone and in combination with the spread limiting chain is the provision of a bumper engaging bar on the end of a tow bar in upwardly and outwardly inclined relation to the tow bar so that any tendency of the towing chain to loosen merely results in the bumper bar wedging downwardly on its outwardly inclined face. The inclined bumper bar and its connected tow bar have the same arrangement of a downwardly projecting end with a towing chain engaging opening, and a chain tightening device on the towing bar.

Should the points of connection between the towing chains and the vehicle frame be more widely spaced than the desired positions of the bumper bars, the towing chains may angle laterally outwardly from the holes in the lower ends of the bumper bars, while the cross chain will keep the coupling heads from spreading.

The drawings of which there are two sheets illustrate two variations of the coupling head.

FIGURE 1 is a plan view of the tow bar assembly.

FIGURE 2 is an enlarged fragmentary side elevational view of the end of one of the tow bars of the assembly connected to a bumper and bumper frame member of an automobile as viewed generally from the side of the bar.

FIGURE 3 is a fragmentary transverse cross sectional view taken along the plane of the line 3—3 in FIGURE 2.

FIGURE 4 is a fragmentary plan view showing varied connections of the tow coupling to a vehicle.

FIGURE 5 is a fragmentary enlarged top plan view of the coupling head on the end of one bar of the tow bar assembly, with two possible positions of the chain connection.

FIGURE 6 is an enlarged fragmentary side elevational view showing a modified form of the coupling head connected to the end of a tow bar.

The tow bar assembly shown in FIGURE 1 consists of a pair of swingably divergent rigid tow bars 10 having one end pivotally connected at 12 to a first coupling element 14 having a connection or coupling 16 adapted to be connected to a towing element on one vehicle. The coupling illustrated conventionally is of the ball hitch type which is common. At their other ends the tow bars 10 are provided with coupling heads of the invention generally indicated at 18 and adapted to be clamped to the surface of a bumper of a vehicle as will be described in greater detail. A spread limiting chain 20 is adjustably connected between the swinging ends of the tow bars 10 to limit the spreading of the couplings 18.

The tow bars 10 and coupling 18 are identical so that a description of one will be sufficient for both. Secured transversely across the end of the tow bar 10 is a generally upright bumper member 22 having an upper portion 24 that is inclined upwardly and outwardly from the end of the tow bar. The lower end of the bumper member is angled straight downwardly and generally perpendicular to the tow bar as at 26 and has a hole or opening 28 formed through its lower end below the tow bar. A pad of deformable cushioning material 30 may be secured along the outer face of the bumper member.

Secured to the tow bar 10 inwardly or to the right of the bumper member 22 is a saddle bracket 32 having a laterally downwardly and outwardly projecting abutment arm 34 with a hole formed therethrough at 36 which is in general alignment with the hole 28 in the lower end of the bumper member. A screw 38 is passed through the hole 36 and has a U-shaped hook 40 secured to its outer end and the outer or left flange 42 of the hook defines a keyhole opening 44 permitting selective engagement of a link 46 of the chain 48 with the hook. The other or outer end of the chain 48 is passed through the opening 28 and carries a hook 50 which permits the chain to be wrapped around a supporting frame member or other rigid part of a vehicle such as the bumper supporting bars indicated by the dotted lines at 52 in FIGURE 2. By tightening a hand wheel nut 54 on the screw 38 the chain 48 can be drawn tight to transmit towing loads from the frame member 52 to the tow bar 10 and to draw the inclined portion 24 of the bumper bar into tight thrust engagement with the exposed surface of the bumper indicated by the dotted lines at 56. It will be noted that the outer inclined face 30 of the bumper member is also inclined transversely inwardly and rearwardly so that the two bumper engaging faces lie in approximately the same plane when the bumper bars 10 are spread into the operative position shown.

In order to reinforce and stiffen the bumper member 22 a brace 58 is welded between the upper end of the bumper member and the saddle 32. One end of the spread limiting chain is connected to one of the anchor plates 60 welded between the ends of the bumper bars and the inner edges of the brace members. The plates 60 have keyhole openings 62 therein and the opposite end 64 of the chain from that shown in FIGURE 2 has a selected link engaged through the hole for selective engagement with the links of the chain 20 to adjust the spacing or angle divergence of the two tow bars 10.

With particular reference to FIGURES 4 and 5, it will be seen that it is possible to attach the coupling heads 18 and bumper bars 24 in various lateral positions relative to the frame member 52 of the vehicle. The towing chains may be aligned with the screws 38 as at 48, or it may be possible to angle them laterally outwardly as at 48B to engage a suitable part of the vehicle frame. In either arrangement, the incline of the bumper bar keeps the coupling tight. The latter arrangement is preferred and utilizes an additional advantage of the double tow bar assembly. The chains angle at the edges of the holes 28 and the lateral component of the towing forces in the chains is off-set or opposed by tension in the cross chain 20. Thus, the towing forces cannot spread the arms or tow bars 10. Further, it will be noted tension directed laterally through both towing chains 48 and the anti-spread chain 20 rigidly locates the two coupling heads 18; there is no opportunity for either head, or the entire tow bar assembly to shift on the bumper.

The modified coupling 18A shown in FIGURE 5 is the same as the first form of coupling illustrated with the exception that the lower end of the bumper member 22A is a continuous straight extension of the inclined portion 24A. The lower straight extension 26A has the same hole or opening 28 formed therethrough for passing the towing load chain 48 as in the first form of the coupling head.

What is claimed as new is:

1. In combination with a rigid tow bar having a first coupling on one end attachable to a vehicle and a second coupling on the other end including a bumper member arranged transversely to the bar and a chain tightening device with a towing load chain connected thereto adjacent to said bumper member,
    said second coupling being characterized by said bumper member having an outer bumper engaging face that is inclined outwardly and upwardly from the end of said bar,
    and a lower portion on said bumper member projecting below said bar with an upright face and defining an opening adapted to pass a chain from said chain tightening device.

2. The combination as defined in claim 1 in which there are two rigid tow bars adjustably divergent from said first coupling with a second coupling on each bar,
    said bumper members having outer faces that are inclined in transversely rearwardly converging relation between said bars as well as outwardly and upwardly from the ends of the bars.

3. The combination as defined in claim 2 in which said tightening means includes an arm secured to said bar and projecting outwardly and downwardly therefrom,
    a screw passed through the end of said arm in general alignment with the opening in the lower end of the towing load chain connected thereto,
    and a nut on said screw in chain tightening thrust engagement with said arm.

4. The combination as defined in claim 3 in which said towing load chain is adjustably connected to said screw by an angled clip connected to the screw and having a transverse flange with a keyhole opening therein selectively engageable with links of said towing chain.

5. The combination as defined in claim 4 in which said bars have anchors at their forward ends,
    a spread limiting chain connected to one of said anchors,
    and a connection on the other of the anchors selectively engageable with a link of said spread limiting chain to adjustably determine the spread between said bars.

6. The combination as defined in claim 5 in which said bumper members have inclined braces connected between their upper ends and said tow bars.

7. The combination as defined in claim 1 in which said bumper member has an angled lower portion projecting below said tow bar and generally perpendicular thereto and through which the opening for said load chain is formed.

8. The combination as defined in claim 2 in which said bumper member has an angled lower portion projecting below said tow bar and generally perpendicular thereto and through which the opening for said load chain is formed.

9. Vehicle towing apparatus comprising, a pair of rigid towing bars swingably connected at one end and having a first coupling connected thereto adjacent their swingably connected ends,
    second couplings on the opposite free ends of said towing bars including transverse bumper bars on the ends of said towing bars,
    said bumper bars projecting below said towing bars and forming chain receiving openings,
    chain tightening means on said towing bars generally aligned with said openings,
    towing chains connected to said tightening means and having frame engaging means on their opposite ends,
    said towing chains being extensible through said openings,
    and a spread limiting chain adjustably engageable between said towing bars at point spaced from the swingable connection between the towing bars.

10. Apparatus as defined in claim 9 in which said spread limiting chain has one end secured to one of said towing bars.
    and means on the other towing bar selectively engageable with different links of said spread limiting chain.

11. Towing apparatus as defined in claim 10 in which said bumper bars project above said towing bars,
    brace means extending between the upwardly extending portions of said bumper bars and their associated towing bar, said spread limiting chain having one end secured to one of said brace means, and the other of said brace means defining a slot sized to pass one link of said spread limiting chain with the end of an adjacent link abutting the brace means at the sides of the slot.

12. Towing apparatus as defined in claim 11 in which said brace means are generally upright plates, said spread limiting chain being secured to one of said plates, the other of said plates having a keyhole opening formed therethrough with the bottom of the opening forming said slot.

References Cited

UNITED STATES PATENTS

| | | | |
|---|---|---|---|
| 2,840,392 | 6/1958 | Miles et al. | 280—502 |
| 3,072,419 | 1/1963 | Safford | 280—502 X |
| 3,119,631 | 1/1964 | Wanamaker | 280—502 X |
| 3,233,917 | 2/1966 | Lindsay | 280—502 |
| 2,887,325 | 5/1959 | Warren | 280—502 |

LEO FRIAGLIA, Primary Examiner

U.S. Cl. X.R.

280—491